(12) United States Patent
Gordon et al.

(10) Patent No.: US 10,384,787 B2
(45) Date of Patent: Aug. 20, 2019

(54) FORMING AN AIR DATA PROBE FROM A POROUS COVER AND BRAZING MATERIAL

(71) Applicant: Honeywell International Inc., Morris Plains, NJ (US)

(72) Inventors: Grant A. Gordon, Peoria, AZ (US); Dayakara Raju Perubandi, Chandler, AZ (US); Matthew J. Pohlman, Huntington Beach, CA (US); Morris G. Anderson, Mesa, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 396 days.

(21) Appl. No.: 15/191,192

(22) Filed: Jun. 23, 2016

(65) Prior Publication Data

US 2017/0369175 A1 Dec. 28, 2017

(51) Int. Cl.
*B64D 15/12* (2006.01)
*B64D 43/02* (2006.01)
*G01P 5/165* (2006.01)

(52) U.S. Cl.
CPC .............. *B64D 15/12* (2013.01); *B64D 43/02* (2013.01); *G01P 5/165* (2013.01)

(58) Field of Classification Search
CPC . B64D 15/12; G01F 1/46; G01F 15/10; G01P 5/165; B05D 3/007; B05D 2202/00; B05D 2350/30; B05D 2451/00
USPC .......... 219/200, 201, 202, 530, 540; 29/611, 29/593, 825; 73/182, 183, 180
See application file for complete search history.

(56) References Cited

U.S. PATENT DOCUMENTS

| | | | |
|---|---|---|---|
| 2,254,155 A | 8/1941 | Reichel | |
| 2,510,986 A | 6/1950 | Larkin | |
| 2,984,107 A | 5/1961 | Strieby et al. | |
| 3,019,384 A * | 1/1962 | Wayne | ................ G01N 27/416 204/407 |
| 3,030,807 A | 4/1962 | Scadron | |
| 3,163,040 A | 12/1964 | Werner | |
| 3,400,583 A | 9/1968 | Newport et al. | |

(Continued)

FOREIGN PATENT DOCUMENTS

| CN | 102141447 | 8/2011 |
|---|---|---|
| EP | 2881205 | 6/2015 |

(Continued)

OTHER PUBLICATIONS

European Patent Office, "Extended European Search Report for EP Application No. 17176285.9", "from Foreign Counterpart to U.S. Appl. No. 15/191,192", dated Dec. 1, 2017, pp. 1-6, Published in: EP.

(Continued)

*Primary Examiner* — Phuong T Nguyen
(74) *Attorney, Agent, or Firm* — Fogg & Powers LLC

(57) ABSTRACT

A probe portion of an air data probe is provided. The probe portion includes an endoskeleton structure having an outer surface, a heater cable disposed along the outer surface of the endoskeleton structure, a porous cover, surrounding the endoskeleton structure and heater cable, and a braze filler that substantially fills gaps between the heater cable and the endoskeleton structure and that substantially fills gaps in the porous metal cover.

9 Claims, 9 Drawing Sheets

(56) References Cited

U.S. PATENT DOCUMENTS

| | | | |
|---|---|---|---|
| 3,535,930 | A | 10/1970 | Rees |
| 3,646,811 | A | 3/1972 | DeLeo et al. |
| 4,378,697 | A | 4/1983 | DeLeo et al. |
| 4,768,283 | A * | 9/1988 | Gellert .................... B29C 45/27 219/542 |
| 4,825,039 | A * | 4/1989 | Yoo .................. A41D 19/01535 219/202 |
| 4,836,019 | A | 6/1989 | Hagen et al. |
| 5,026,001 | A | 6/1991 | Wright et al. |
| 5,046,360 | A * | 9/1991 | Hedberg .................... G01F 1/46 73/182 |
| 5,337,602 | A | 8/1994 | Gibson |
| 5,442,958 | A | 8/1995 | Hagen |
| 5,543,183 | A | 8/1996 | Streckert et al. |
| 5,616,861 | A | 4/1997 | Hagen |
| 6,070,475 | A | 6/2000 | Muehlhauser et al. |
| 6,134,972 | A | 10/2000 | Streckert et al. |
| 6,543,298 | B2 | 4/2003 | Cronin et al. |
| 6,672,152 | B2 | 1/2004 | Rouse et al. |
| 6,957,586 | B2 | 10/2005 | Sprague |
| 7,334,467 | B1 | 2/2008 | DuPuis |
| 7,407,136 | B2 | 8/2008 | Murg |
| 7,597,018 | B2 | 10/2009 | Braun et al. |
| 8,042,723 | B2 | 10/2011 | Holi |
| 8,696,309 | B2 | 4/2014 | Riggi, Jr. et al. |
| 9,116,162 | B2 | 8/2015 | Leblond et al. |
| 9,254,537 | B2 | 2/2016 | Li et al. |
| 9,664,542 | B2 | 5/2017 | Gordon et al. |
| 2008/0160332 | A1* | 7/2008 | Dighe .................. B23K 3/0607 428/554 |
| 2013/0145862 | A1* | 6/2013 | Leblond .................. G01P 5/165 73/861.68 |
| 2014/0236083 | A1* | 8/2014 | Sims ................. A61M 16/0816 604/114 |
| 2015/0360328 | A1 | 12/2015 | Li et al. |
| 2016/0303674 | A1* | 10/2016 | Stankowski ............. B23H 9/10 |

FOREIGN PATENT DOCUMENTS

| | | |
|---|---|---|
| FR | 1439443 | 5/1966 |
| FR | 1472440 | 3/1967 |
| WO | 9205414 | 4/1992 |
| WO | 9816837 | 4/1998 |
| WO | 2014105245 | 7/2014 |
| WO | 2015022527 | 2/2015 |

OTHER PUBLICATIONS

State Intellectual Property Office, P.R. China, "Office Action, from CN Application No. 201610689731.0 dated Dec. 7, 2017", "from Foreign Counterpart of U.S. Appl. No. 14/830,943", dated Dec. 7, 2017, pp. 1-16, Published in: CN.

European Patent Office, "Extended European Search Report from EP Application No. 16184411.3 dated Dec. 20, 2016", "from Foreign Counterpart of U.S. Appl. No. 14/830,943", dated Dec. 20, 2016, pp. 18, Published in: EP.

U.S. Patent and Trademark Office, "Notice of Allowance", "U.S. Appl. No. 14/830,943", dated Jan. 30, 2017, pp. 1-12, Published in: US.

U.S. Patent and Trademark Office, "Restriction Requirement", "U.S. Appl. No. 14/830,943", dated Nov. 1, 2016, pp. 1-6, Published in: US.

European Patent Office; Communication pursuant to Article 94(3) EPC from EP Application No. 16184411.3 dated Apr. 5, 2018; from Foreign Counterpart of U.S. Appl. No. 14/830,943; pp. 1-5; dated Apr. 5, 2018; Published: EP.

State Intellectual Property Office, P.R. China; Office Action from CN Application No. 201610689731.0 dated May 11, 2018; from Foreign Counterpart of U.S. Appl. No. 14/830,943; pp. 1-4; dated May 11, 2018; Published: CN.

Anderson et al, "Air Data Probe With Double Helical Coil Heater Cable", "U.S. Appl. No. 14/878,650, filed Oct. 8, 2015", Oct. 8, 2015, pp. 1-18, Published in: US.

Wong et al., "Air Data Probe Heater Utilizing Low Melting Point Metal", "U.S. Appl. No. 14/919,014, filed Oct. 21, 2015", Oct. 21, 2015, pp. 1-25, Published in: US.

Hoque, "Basic Aircraft Instruments system—Pitot Static Probes", "retrived on May 24, 2106 from http://www.zoombd24.com/basic-aircraft-instruments-system-pitot-static-probes", Mar. 11, 2015, pp. 1-14.

"AWWA-QG Progress Eagle Quantum Airplane", "Retrived Apr. 13, 2016 from https://www.behance.net/gallery/20804291/AWWAQG-Progress-Eagle-Quantum-Airplane (Dec. 1990)", , pp. 1-2.

Gordon et al., "Systems and Methods for Additive Manufacturing for Air Data Probes", "U.S. Appl. No. 14/830,943, filed Aug. 20, 2015", Aug. 20, 2015, pp. 1-21, Published in: US.

State Intellectual Property Office, P.R. China; "Third Office Action from CN Application No. 201610689731.0 dated Sep. 18, 2018", "from Foreign Counterpart of U.S. Appl. No. 14/830,943"; pp. 1-7, dated Sep. 18, 2018, Published in: CN.

* cited by examiner

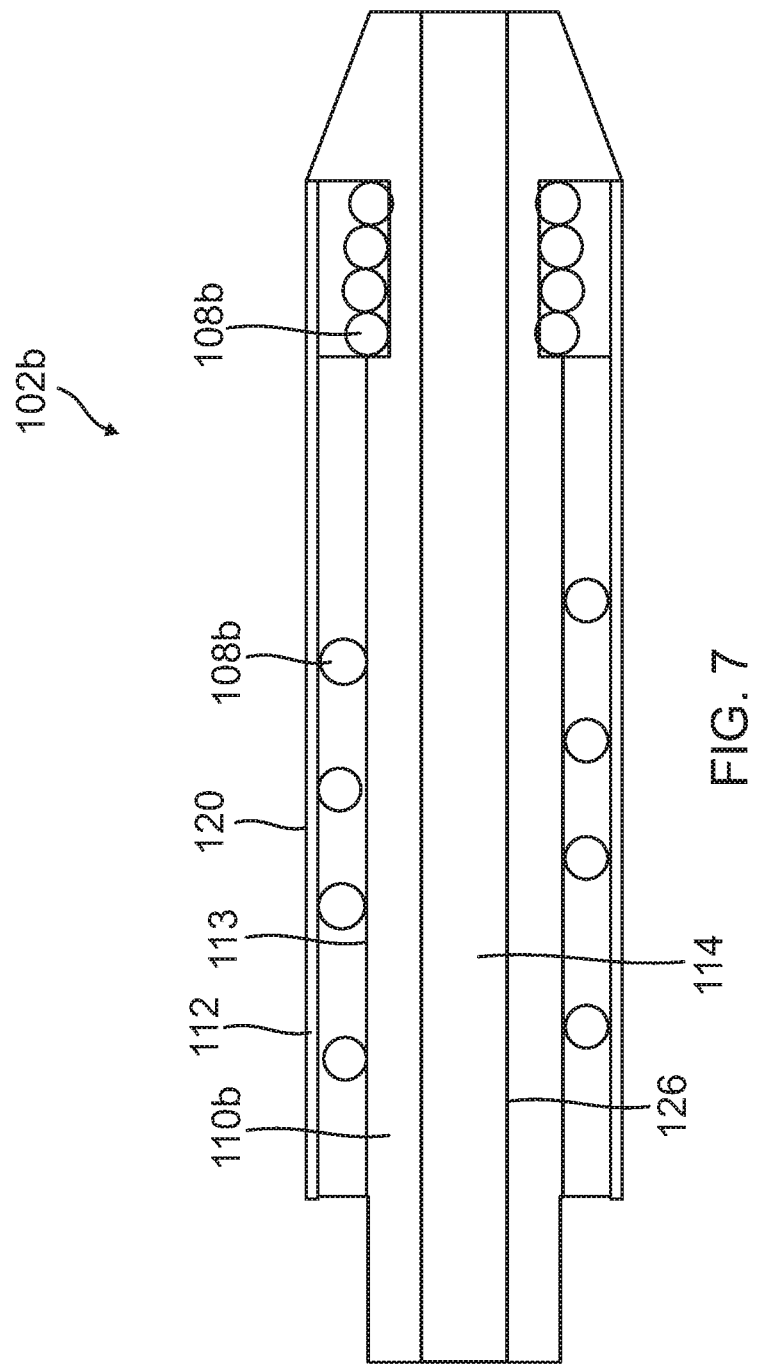

FORMING AN AIR DATA PROBE FROM A POROUS COVER AND BRAZING MATERIAL

BACKGROUND

Conventionally, air data probes are fabricated by brazing components together to assemble a probe with a given aerodynamic shape. These air data probes include a mechanism to generate heat to deice and maintain an ice-free condition while operating in adverse weather conditions. The anti-icing and de-icing requirements are the subject of a number of Aerospace Standards and Aerospace Recommended Practices. In 2014, the Department of Transportation and the Federal Aviation Administration, issued a new rule in order to improve probe safety by addressing supercooled large drop icing conditions, mixed phase and ice crystal icing conditions. As a result of these new regulations, the challenge of meeting the anti-ice and deicing requirements for air data probes has become significantly more demanding.

One approach to meet these new demands is to place the heating source (e.g., heater cable) closer to the external surface of the probe portion of the air data probe. Unfortunately, with current fabrication techniques, the probe body may develop gaps around the heat source leading to reduced mechanical strength as well as hot spots within the heater cable and cold spots on the exterior surface of the probe. The hot spots in the cable will lead to accelerated heater cable aging and the cold spots of the exterior surface will act as nucleation sites for ice formation during service.

For the reasons stated above and for other reasons stated below which will become apparent to those skilled in the art upon reading and understanding the specification, there is a need in the art for improved systems and methods for fabricating air data probes that distribute heat more uniformly over the exterior surface of the probe portion of the air data probe.

SUMMARY

The Embodiments of the present invention provide methods and systems for forming a probe portion for an air data probe from a porous cover and a brazing material and will be understood by reading and studying the following specification.

In one embodiment, a probe portion of an air data probe is provided. The probe portion includes an endoskeleton structure having an outer surface, a heater cable disposed along the outer surface of the endoskeleton structure, a porous cover, surrounding the endoskeleton structure and heater cable, and a braze filler that substantially fills gaps between the heater cable and the endoskeleton structure and that substantially fills gaps in the porous metal cover.

DRAWINGS

Embodiments of the present invention can be more easily understood and further advantages and uses thereof more readily apparent, when considered in view of the description of the preferred embodiments and the following figures in which:

FIG. 7 is a cross-section view of another embodiment of a probe for an air data probe;

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide an air data probe that distributes heat more uniformly over the exterior surface of the probe portion of the air data probe. Embodiments of the present invention use an endoskeleton design along with a braze filler to create the probe portion of the air data probe. In one embodiment, the endoskeleton structure is used in conjunction with a wide gap braze material to mount the heater cable on outer surface/side of the endoskeleton structure using brazing techniques other than torch brazing. In other embodiments, the probe portion of the air data probe is fabricated with a porous cover that is placed over the endoskeleton structure to provide a supply of braze filler material while the brazing process is under way to form the probe portion without gaps around the heater cable. In other embodiments, two or more braze filler formulations in layers are used to simultaneously satisfy the need to fill the small cracks and voids and to keep the braze filler in place during the braze cycle as well as to provide a reservoir of braze filler to occupy the space generated due to shrinkage.

Figure 1:
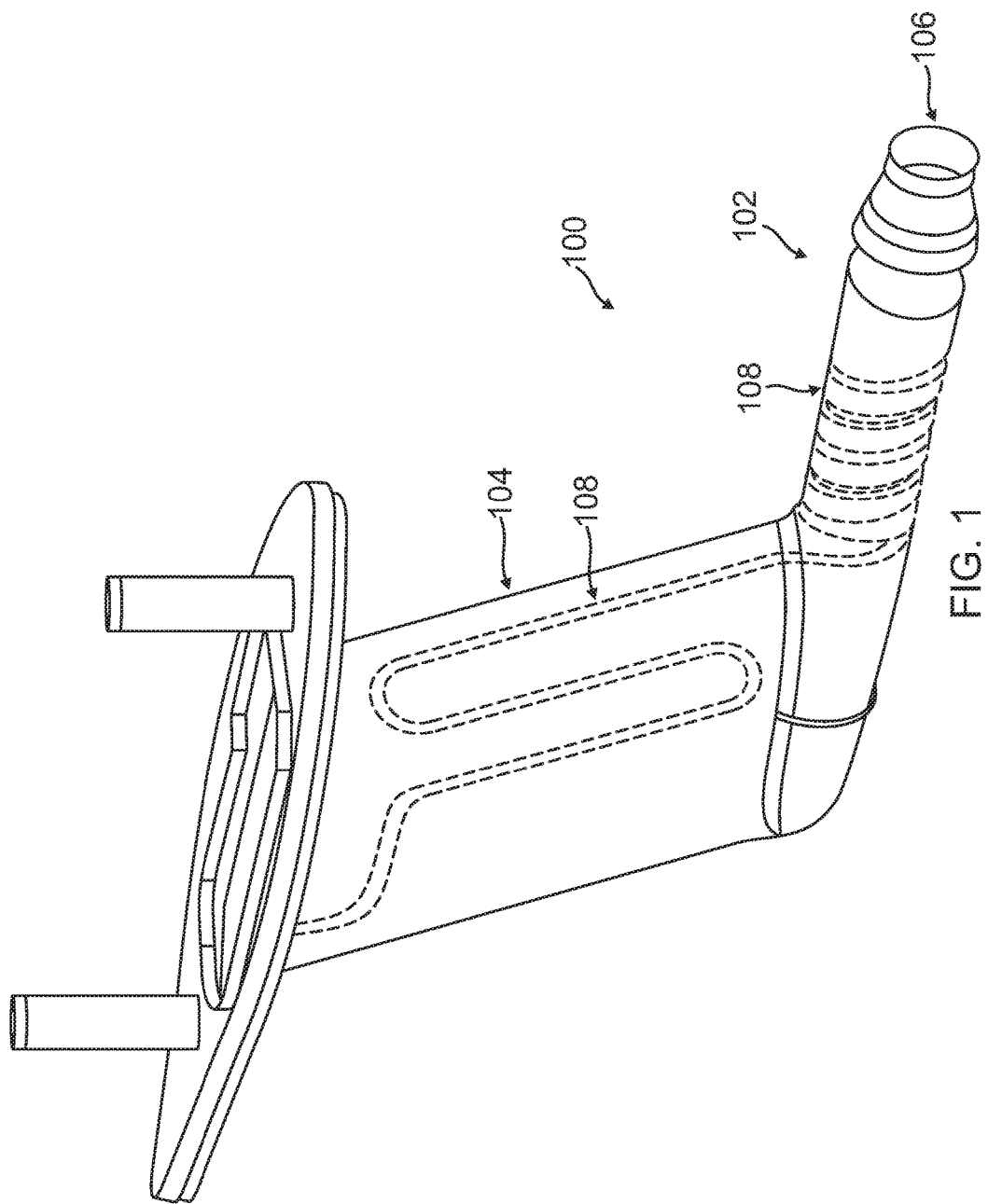
FIG. 1 is a perspective view of one embodiment of an air data probe with a probe constructed from a porous cover and a brazing material that embeds a heating element between the porous cover and an endoskeleton structure.

FIG. 1 is a perspective view of an air data probe 100 according to one embodiment of the present disclosure. The air data probe 100 includes a probe portion 102 and a strut portion 104 that connects the probe portion 102 to a vehicle. In exemplary embodiments, the probe portion 102 is a pitot tube, pitot-static tube, or the like. The probe portion 102 is positioned so air enters the probe portion 102 through the inlet 106. In one implementation, the air data probe 100 is used to determine the airspeed of an aircraft. To prevent ice build-up, air data probe 100 includes a heating element 108 that is formed within the structure of both the probe portion 102 and the strut portion 104.

Figure 2:
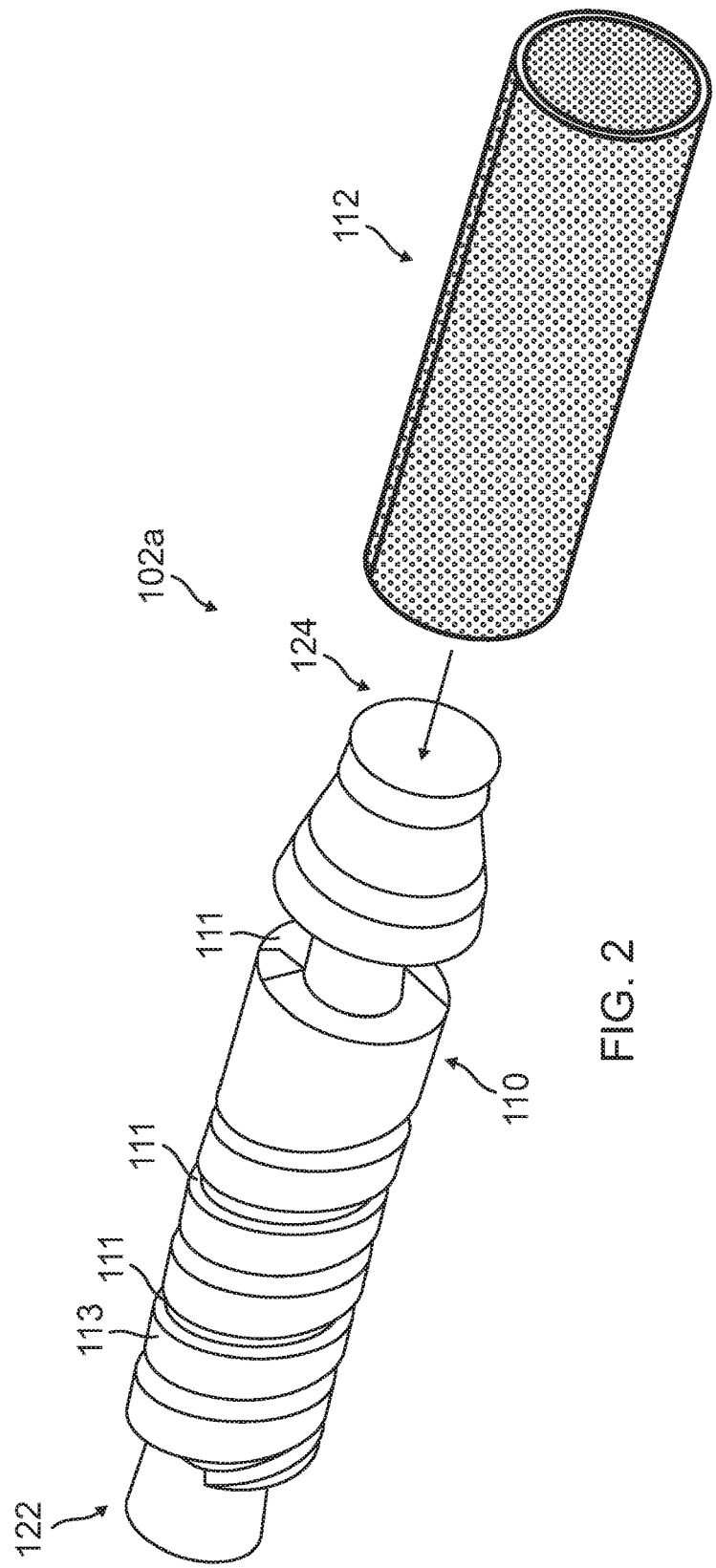
FIG. 2 is a perspective view of one embodiment of a probe for an air data probe including an endoskeleton structure and a porous cover.
Figure 3:
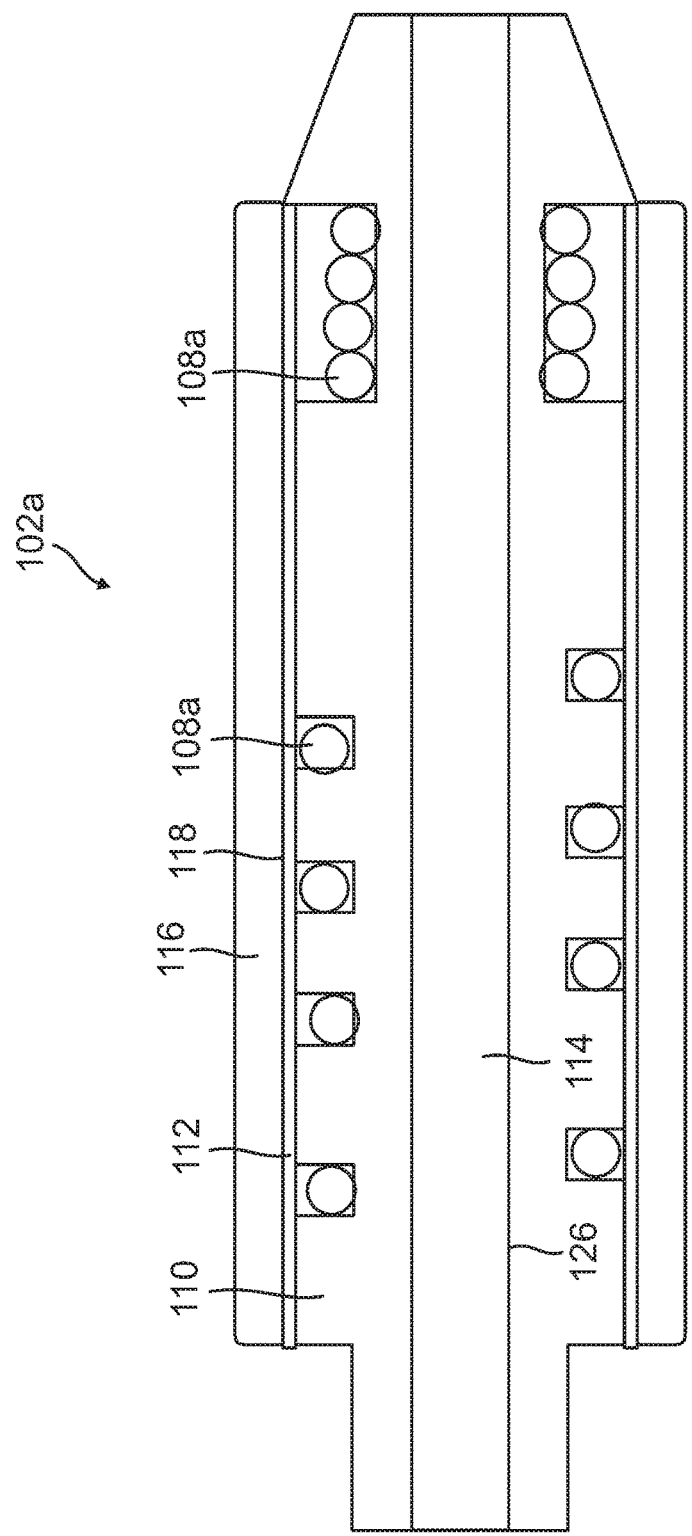
FIG. 3 is a cross-section view of one embodiment of a probe for an air data probe.

FIGS. 2 and 3 illustrate one embodiment of a probe portion 102a for use, for example, in air data probe 100 of FIG. 1. In this embodiment, probe portion 102a includes an endoskeleton design and fabrication approach to meet the new demands regarding anti-icing and deicing. The endoskeleton design of this embodiment uses a grooved probe body to wrap and locate a heater cable in the probe portion 102a.

The endoskeleton design includes endoskeleton structure (probe body) 110 and porous cover 112. The endoskeleton structure 110 has a proximal end 122 and a distal end 124. The proximal end 122 of the endoskeleton structure 110 is coupled, for example, to strut 104 of FIG. 1. The endoskeleton structure 110 includes an outer surface 113 and an opposing inner surface 126 that define an interior channel 114 between the proximal end 122 and the distal end 124 of the endoskeleton structure 110. The interior channel 114 has an opening for receiving a fluid at the distal end 124 of the endoskeleton structure 110.

Endoskeleton structure 110 also includes a channel 111 formed in outer surface 113 of endoskeleton structure 110. Heater cable 108a is wrapped around endoskeleton structure 110 in the channel 111. In some embodiments, braze paste is applied to this wrapped assembly. Porous cover 112 is slid in place over endoskeleton structure 110. Various embodiments for porous cover 112 are shown by way of example and not by way of limitation in FIGS. 8A to 8E described in more detail below. A layer of brazing material 116 is applied to an exterior surface of porous cover 112. In many embodiments, porous cover 112 is a metal mesh that has gaps that allow brazing material to flow through the porous cover 112 during a brazing process into gaps as described in more detail below.

Porous cover 112 is intended to capture the braze paste inside a pocket formed between the endoskeleton structure 110 and the porous cover 112. In some embodiments, the braze material is applied in a paste form consisting of an atomized metal powder, a flux (when necessary) and a binder to hold the components together in suspension. Pastes can be controlled with the correct dispensing equipment and hence tight control can be maintained on material usage in a production environment. However the gel-binder, which is generally mixed with equal parts with the filler metal, is consumed by the firing/brazing process. When braze material is applied as a dry powder the packing factor of the powder also leads to a volume contraction between the dry powder and the final braze condition. Hence the volume of the applied braze material shrinks during the brazing operation. Unless an additional supply of braze material is available to replace the lost volume the amount of braze material inside a sealed volume shrinks and voids are inevitable. To avoid this situation, layer of brazing material 116 is applied to surface 118 of porous cover 112.

Once layer of brazing material 116 is applied, endoskeleton structure 110, heating cable 108a, porous cover 112, and layer of brazing material 116 are heated to a point to melt the brazing material 116. Advantageously, the brazing material fills the holes in the porous cover 112 as well as any gaps between the heating cable 108a and the channel 111.

Figure 4:
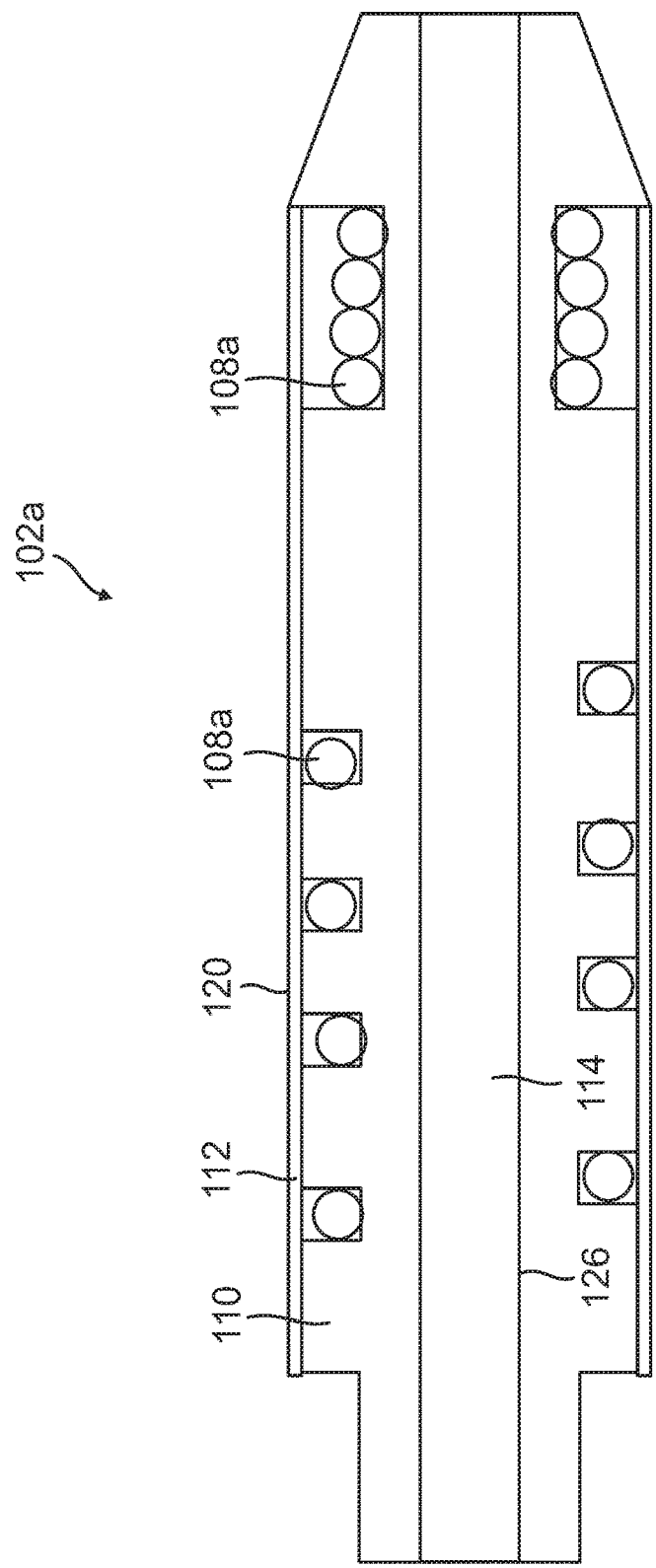
FIG. 4 is a cross-section view of one embodiment of a probe for an air data probe.

External surface 120 of probe portion 102 is machined to provide a final, finished surface corresponding to a desired shape for the probe portion 102 as shown in cross section in FIG. 4.

Placing the heater cable 108 closer to the external surface 120 of the probe portion 102a improves the anti-icing and de-icing capabilities of the probe portion for a given input power. The design of probe portion 102a also allows for more generous curvature of the heater cable 108a as compared to the tighter coils that would be needed to slip the heater cable into the interior of the probe body, e.g., in channel 111. Both of these features are advantageous.

Gap size is a parameter that can be used to achieve a good braze. The gap size is generally chosen to match the alloy used for the brazing operation. For example flux brazing applications of Silver brazes calls for a joint clearance of 0.002 to 0.005 inch. This gap is known to provide sufficient capillarity action to draw the liquid metal formed at the braze temperatures into the gaps and cracks. A combination of surface tension and adhesion forces cause the liquid to move into the narrow spaces overcoming any gravitational attraction for that small volume of material. This capillary action has its limits however and when the gaps are too large the gravitation forces dominate and the liquid braze flows into puddles. These puddles of braze material may cause voids. For example, if a traditional cover is used in place of porous cover 112 (and layer of brazing material 116), the gaps in the channel 111 may be too large for the capillary action necessary to fill the voids between the heater cable 108 and the channel 111 thereby leaving voids in the probe portion 102.

To overcome this potential problem, the probe portion 102a in this embodiment is produced using an endoskeleton brazing approach that provides a supply of braze material. The supply of brazing material is the layer of brazing material 116 on porous cover 112. This layer of brazing material 116 along with the porous cover 112 accommodates the shrinkage and inhibits drainage of the braze materials so that they do not drain away when heated.

In addition, in some embodiments, a wide gap brazing approach is used. Wide gap brazing approaches recognizes that certain complex brazing applications may not be able to hold the necessary gap tolerance across the entire interface/geometry. There are at least two kinds of wide gap braze powder that have been developed specifically to treat these conditions. First there are alloys that have a chemical makeup that results in a sluggish, mushy alloy at their 'melting point.' Braze pastes made from these alloys can be used to bridge wider gaps than standard braze pastes. The second type of wide-gap paste is a blend of a braze alloy plus a filler powder. The filler metal melts at a higher temperature than the braze alloy and hence forms a mushy less liquid braze at the braze temperature. Specific wide gap braze pastes can be made by blending various ratios of filler powder with the braze alloy. The size of the powder is also a consideration that can allow the wide gap braze paste to be dialed in to a given gap size. In some embodiments, the wide gap braze paste is applied to surface 113 of endoskeleton structure 110 and channel 111 prior to placement of porous cover 112.

By controlling the hole size and porosity fraction of the porous cover 112, the porous cover 112 can act as a structure that provides a place for the additional externally applied 'extra' braze alloy in layer of brazing material 116 to feed the braze joint. This will supply additional braze material when the volume contraction occurs as the organic binder is burned out or the dry powder volume contracts. The porous network acts to provide a mesh of connected surface area that helps the mushy, sluggish wide gap braze paste further resist puddling.

As mentioned, the porous cover 112 is machined to final profile shape for the probe portion 102 after the brazing process. To facilitate machining a ductile mesh material should be used, such as the materials shown and described below with respect to FIGS. 8A to 8E. In some embodiments, Nickel plating of the shaped probe portion 102a is used as a final step.

It should be understood that there is an interplay between the viscosity of the hot braze alloy (ratio of filler to alloy, mesh size of filler), the surface area of the porous cover 112, the mesh hole size, the cohesion forces within the braze material and the gaps that exist across the braze zone. And the area to be brazed has various gaps sizes. Starting at the channel 111, where the heater cable 108 touches the base of the channel 111, the gaps can be small. Working towards the surface 113 of the endoskeleton structure 110, the gaps will increase in size because the heater cable 108 has a round cross-section and the groove is substantially square or rectangular is cross-section as shown in FIG. 3. Finally at the interface between the porous cover 112 and the endoskeleton structure 110, the gaps between adjacent metal materials is at its largest.

Figure 8B:
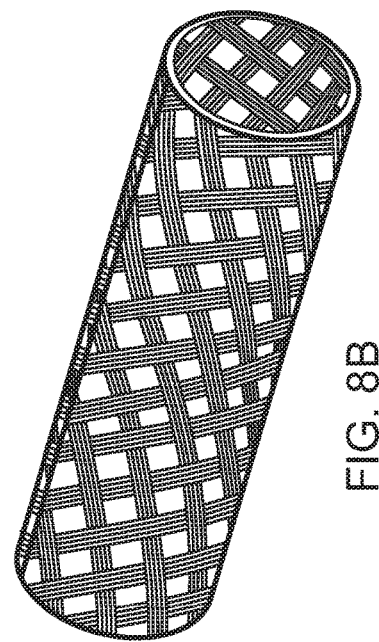
FIGS. 8A to 8E are perspective views of various embodiments for a porous cover for a probe for an air data probe.
Figure 8C:
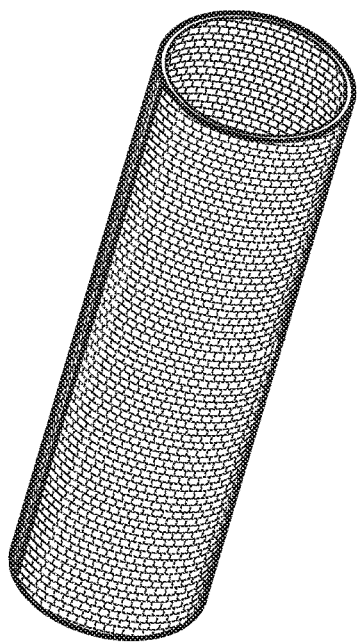
Figure 8A:
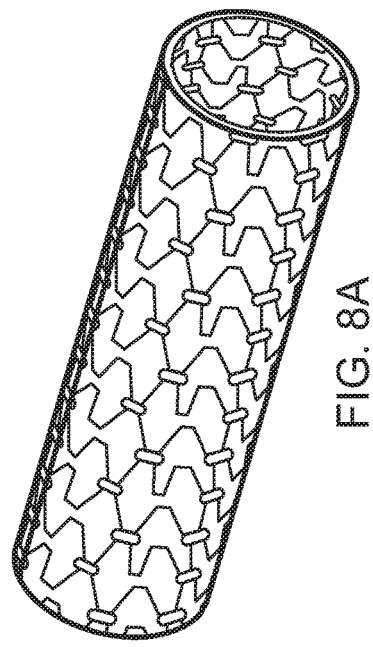
Figure 8E:
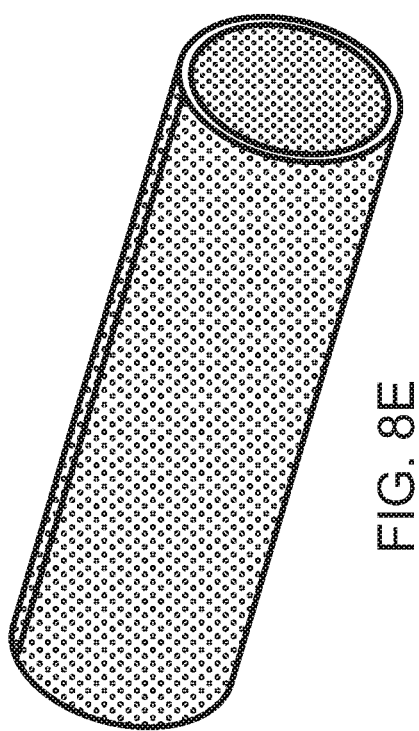
Figure 8D:
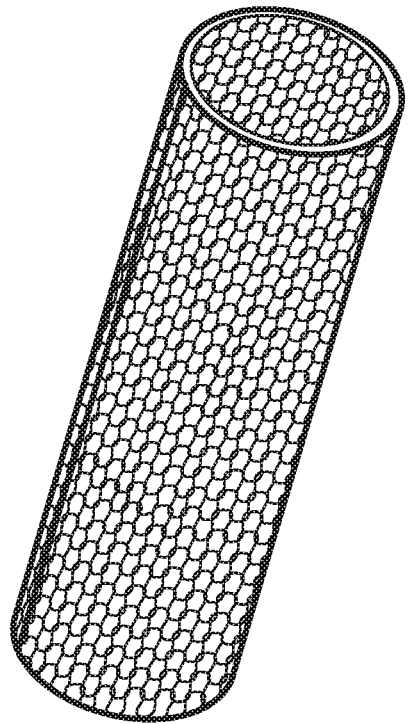

FIGS. 8A to 8E illustrate a variety of inexpensive porous metal covers that could be considered for use as the outer metal mesh or porous cover, e.g., porous cover 112 of FIGS. 2-7, of the air data probe. Most of these metal forms can be made with a variety of materials such as: Stainless Steels, Titanium, Nitinol, Nickel Alloys, Platinum Alloys, Magnesium Alloys, Niobium, etc. FIG. 8A illustrates a porous cover formed as an expandable cage or stent. The porous cover can be formed using other techniques, e.g., knitted wire mesh (FIG. 8D), braided metal mesh (FIG. 8B), perforated tubes (FIG. 8C), and sintered mesh or filter tubes (FIG. 8E). The open area of the porous cover can be varied from highly porous (FIG. 8B) to micron size holes, such as for the sintered filter tubes shown in FIG. 8E. Given that each of these forms can be made in a variety of configuration there is clearly plenty of choice for metal mesh covers.

Because the gap sizes vary within the braze zone it may be necessary to have two braze formulations. A lower viscosity braze material could be used in the groove region and a higher viscosity braze material e.g. due to braze filler mixing, could be loaded onto the outer metal porous covering of the probe.

Figure 5:
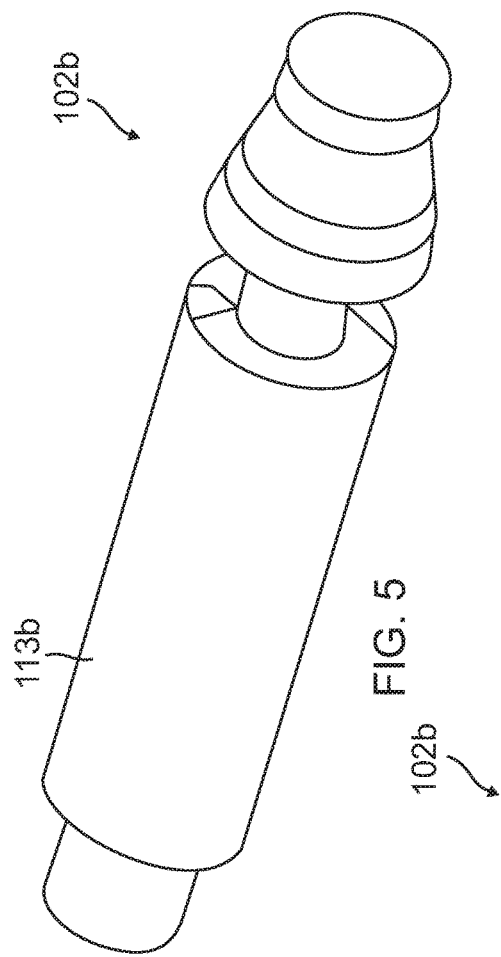
FIG. 5 is a perspective view of another embodiment of an endoskeleton structure for a probe of an air data probe.
Figure 6:
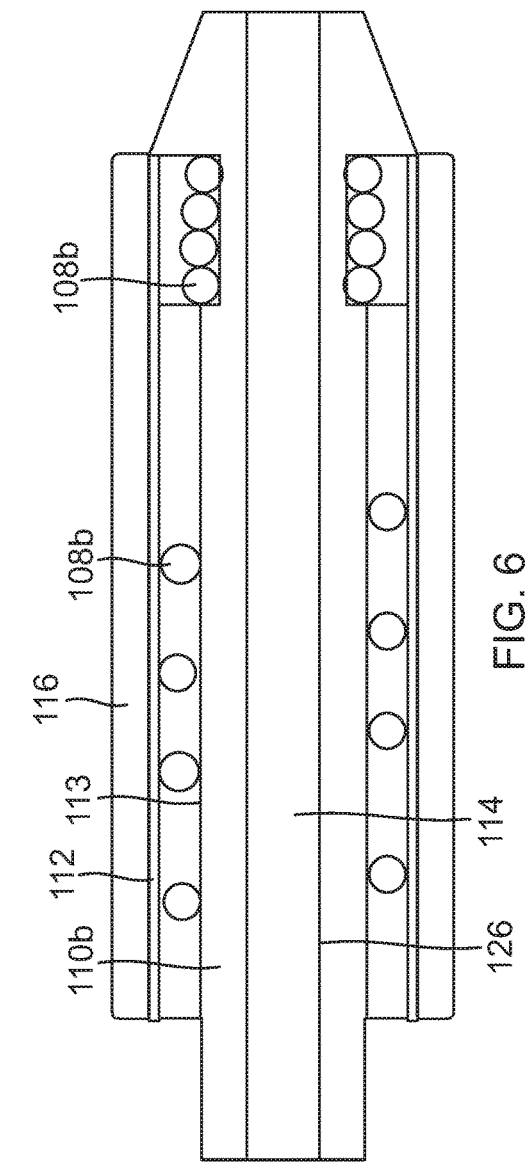
FIG. 6 is a cross-section view of another embodiment of a probe for an air data probe.

FIGS. 5-7 illustrate an alternative embodiment of a probe portion 102b for an air data probe such as air data probe 100 of FIG. 1 in which the endoskeleton body 110b does not have a channel for in exterior surface 113. Instead, the heater cable 108b is wrapped around endoskeleton structure 110b on surface 113. Otherwise, the reference numerals in FIGS. 5-7 correspond to like structures as in FIGS. 2-4. In this embodiment, brazing material may be applied to surface 113 of endoskeleton structure in addition to layer of brazing material 116 that is applied to porous cover 112.

Figure 9:
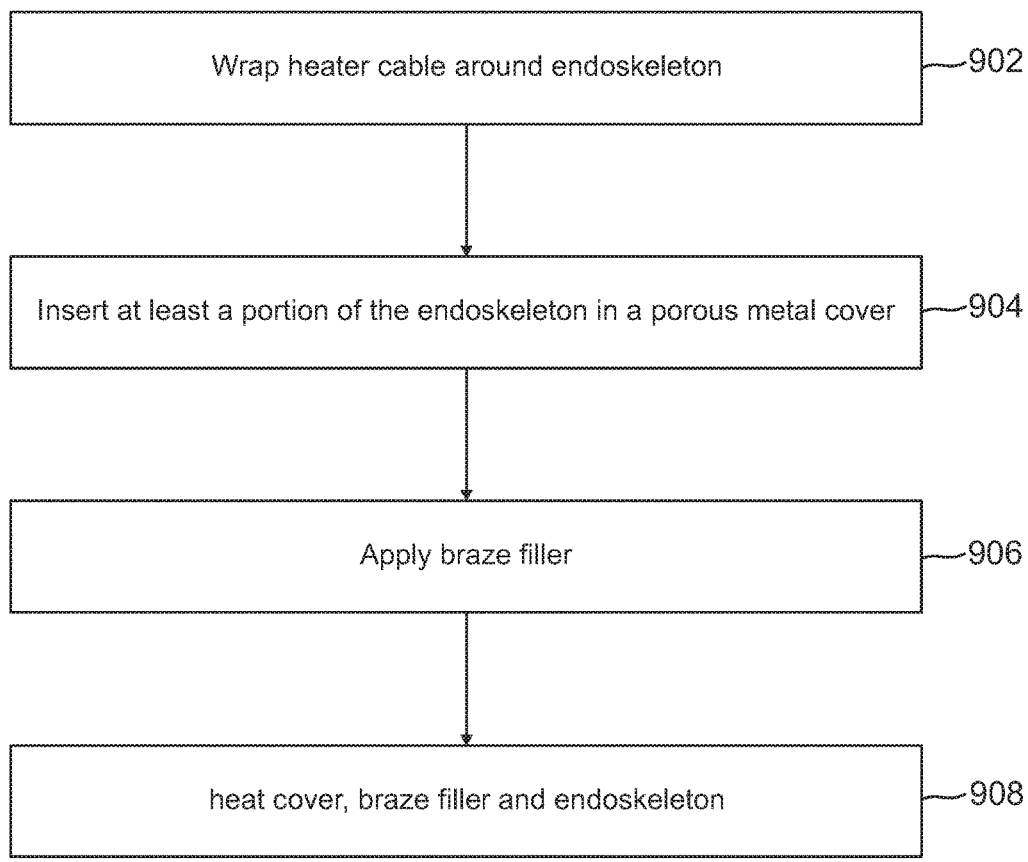
FIG. 9 is a flow chart for an embodiment of a process for manufacturing an air data probe.

FIG. 9 illustrates an embodiment of a process for manufacturing an air data probe. Specifically, a process for forming the probe portion of the air data probe such as probe portion 102a or 102b described above. The method begins at block 902 with wrapping the heater cable around an endoskeleton structure. The heater cable can either be wrapped in a channel 111 in a surface 113 of the endoskeleton structure 110 as in FIGS. 2-4 or around the surface 113 of the endoskeleton structure 110b as shown in FIGS. 4-7. Additionally, as discussed above, a lower viscosity braze filler may be applied in the channel area or over the surface of the endoskeleton structure prior to wrapping the heater cable. Further, the lower viscosity braze filler may be applied to fill any remaining spaces between the cable and the channel as appropriate.

At block 904, at least a portion of the endoskeleton structure is inserted into a porous metal cover. Further, at block 906 a braze material is applied to the porous cover. For example, the covered assembly is rolled in a higher viscosity braze filler to load the porous cover with braze material such that the porous cover acts like a metal sponge to hold a quantity of braze filler. At block 908, the assembly is sent through a vacuum furnace cycle. The porous cover could then be machined to provide the desired shape for the probe portion of the air data probe. Additionally, in some embodiments, the exterior surface, after machining, is plated with a Nickel material.

In an alternative embodiment, the filler powder could be used between the heater cable and endoskeleton structure at block 902 while lower viscosity braze paste would be loaded onto the porous cover at block 906. The braze alloy would wick into the inner region from the outer wrapped and loaded porous cover (e.g., metal sponge).

There are also some inherent advantages of porous metal covering approach over the present design approach. The metal sponge approach can accommodate a multistep braze method to build up the outer surface thickness through repetitive application. Or it can be repaired and re-brazed in the case of errors, whereas the solid metal cover is not conducive to easy repair or multiple braze steps.

EXAMPLE EMBODIMENTS

Example 1 includes a probe portion of an air data probe, the probe portion comprising: an endoskeleton structure having an outer surface; a heater cable disposed along the outer surface of the endoskeleton structure; a porous cover, surrounding the endoskeleton structure and heater cable; and a braze filler that substantially fills gaps between the heater cable and the endoskeleton structure and that substantially fills gaps in the porous metal cover.

Example 2 includes the probe portion of Example 1, wherein the outer surface of the endoskeleton contains a channel and wherein the heater cable is disposed in the channel.

Example 3 includes the probe portion of any of Examples 1-2, wherein the porous cover comprises a mesh fabricated from one or more of Stainless Steel, Titanium, Nitinol, a Nickel Alloy, a Platinum Alloy, a Magnesium Alloy, or Niobium.

Example 4 includes the probe portion of any of Examples 1-3, wherein the porous cover comprises one of an expandable metal stent, a knitted wire mesh, a braided metal mesh, a perforated tube, or a sintered mesh tube.

Example 5 includes the probe portion of any of Examples 1-4, wherein the braze filler comprises a wide gap braze paste.

Example 6 includes the probe portion of any of Examples 1-5, wherein the braze filler comprises a blend of filler powder and braze alloy.

Example 7 includes the probe portion of any of Examples 1-6, wherein the braze filler comprises first and second braze materials having different viscosities, wherein the viscosity of the first braze material is higher than the viscosity of the second braze material.

Example 8 includes an air data probe, comprising: a strut that is configured to be attached to a vehicle; and a probe, coupled to the strut, the probe including: an endoskeleton structure having a proximal end and a distal end, the proximal end of the endoskeleton structure coupled to the strut, the endoskeleton structure including an outer surface and an opposing inner surface that define an interior channel between the proximal and distal ends of the endoskeleton structure, wherein the interior channel has an opening for receiving a fluid at the distal end of the endoskeleton structure, and wherein the outer surface of the endoskeleton structure has a second channel formed therein; a heater cable disposed in the second channel along the outer surface of the endoskeleton structure; a porous metal cover, surrounding the endoskeleton structure and heater cable; and a braze filler that substantially fills gaps between the heater cable and the second channel and that substantially fills gaps in the porous metal cover to provide the probe with a substantially smooth outer surface.

Example 9 includes the air data probe of Example 8, wherein the porous metal cover comprises a mesh fabricated from one or more of Stainless Steel, Titanium, Nitinol, a Nickel Alloy, a Platinum Alloy, a Magnesium Alloy, or Niobium.

Example 10 includes the air data probe of any of Examples 8-9, wherein the porous metal cover comprises one of an expandable metal stent, a knitted wire mesh, a braided metal mesh, a perforated tube, or a sintered mesh tube.

Example 11 includes the air data probe of any of Examples 8-10, wherein the braze filler comprises a wide gap braze paste.

Example 12 includes the air data probe of any of Examples 8-11, wherein the braze filler comprises a blend of filler powder and braze alloy.

Example 13 includes the air data probe of any of Examples 8-12, wherein the braze filler comprises a first and second braze materials having different viscosities, wherein the viscosity of the first braze material is higher than the viscosity of the second braze material.

Example 14 includes a method for forming a probe for an air data probe, the method comprising: wrapping a heater cable around an endoskeleton structure; inserting at least a portion of the endoskeleton structure and heater cable into a porous metal cover; applying a braze filler to the porous metal cover; and heating the porous metal cover, braze filler and endoskeleton structure.

Example 15 includes the method of Example 14, wherein wrapping the heater cable around the endoskeleton structure comprises wrapping the heater cable in a channel on an outer surface of the endoskeleton structure.

Example 16 includes the method of any of Examples 14-15, wherein wrapping the heater cable around the endoskeleton structure comprises wrapping the heater cable on an outer surface of the endoskeleton structure.

Example 17 includes the method of any of Examples 15-16, wherein applying a braze filler comprises applying a first braze filler having a first, lower viscosity in the channel, and applying a second braze filler having a second, higher viscosity to the porous metal cover.

Example 18 includes the method of any of Examples 14-17, wherein inserting at least a portion of the endoskeleton structure comprises inserting at least a portion of the endoskeleton structure into one of an expandable metal stent, a knitted wire mesh, a braided metal mesh, a perforated tube, or a sintered mesh tube.

Example 19 includes the method of any of Examples 14-18, and further comprising machining an exterior surface of the porous metal cover after heating the porous metal cover, braze filler and endoskeleton structure.

Example 20 includes the method of Example 19, and further comprising plating the machined exterior surface of the porous metal cover.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A probe portion of an air data probe, the probe portion comprising:
   an endoskeleton structure having an outer surface;
   a heater cable disposed along the outer surface of the endoskeleton structure;
   a porous metal cover, surrounding the endoskeleton structure and heater cable; wherein the porous metal cover includes a plurality of holes; and
   a brazing material that fills gaps between the heater cable and the endoskeleton structure and that fills the holes in the porous metal cover, wherein the brazing material comprises at least one of a wide gap braze paste or a blend of filler powder and braze alloy.

2. The probe portion of claim 1, wherein the outer surface of the endoskeleton contains a channel and wherein the heater cable is disposed in the channel.

3. The probe portion of claim 1, wherein the porous metal cover comprises a mesh fabricated from one or more of Stainless Steel, Titanium, Nitinol, a Nickel Alloy, a Platinum Alloy, a Magnesium Alloy, or Niobium.

4. The probe portion of claim 1, wherein the porous metal cover comprises one of an expandable metal stent, a knitted wire mesh, a braided metal mesh, a perforated tube, or a sintered mesh tube.

5. The probe portion of claim 1, wherein the brazing material comprises first and second braze materials having different viscosities, wherein the viscosity of the first braze material is higher than the viscosity of the second braze material.

6. An air data probe, comprising:
   a strut that is configured to be attached to a vehicle; and
   a probe portion, coupled to the strut, the probe portion including:
      an endoskeleton structure having a proximal end and a distal end, the proximal end of the endoskeleton structure coupled to the strut, the endoskeleton structure including an outer surface and an opposing inner surface that define an interior channel between the proximal and distal ends of the endoskeleton structure, wherein the interior channel has an opening for receiving a fluid at the distal end of the endoskeleton structure, and wherein the outer surface of the endoskeleton structure has a second channel formed therein;
      a heater cable disposed in the second channel along the outer surface of the endoskeleton structure;
      a porous metal cover, surrounding the endoskeleton structure and heater cable; wherein the porous metal cover includes a plurality of holes; and
      a brazing material that fills gaps between the heater cable and the second channel and that fills holes in the porous metal cover to provide the probe with a substantially smooth outer surface, wherein the brazing material comprises at least one of a wide gap braze paste or a blend of filler powder and braze alloy.

7. The air data probe of claim 6, wherein the porous metal cover comprises a mesh fabricated from one or more of Stainless Steel, Titanium, Nitinol, a Nickel Alloy, a Platinum Alloy, a Magnesium Alloy, or Niobium.

8. The air data probe of claim 6, wherein the porous metal cover comprises one of an expandable metal stent, a knitted wire mesh, a braided metal mesh, a perforated tube, or a sintered mesh tube.

9. The air data probe of claim 6, wherein the brazing material comprises a first and second braze materials having different viscosities, wherein the viscosity of the first braze material is higher than the viscosity of the second braze material.

* * * * *